US012619915B2

(12) United States Patent
Lopes et al.

(10) Patent No.: US 12,619,915 B2
(45) Date of Patent: May 5, 2026

(54) MACHINE LEARNING PIPELINE AUTOMATION

(71) Applicant: Dell Products, L.P., Round Rock, TX (US)

(72) Inventors: Leandro Lopes, Austin, TX (US); Francisco Garcia Montemayor, Cedar Park, TX (US); Thiagarajan Ramakrishnan, Round Rock, TX (US); Robert Mujica, Dublin (IE)

(73) Assignee: Dell Products, L.P., Round Rock, TX (US)

( * ) Notice: Subject to any disclaimer, the term of this patent is extended or adjusted under 35 U.S.C. 154(b) by 762 days.

(21) Appl. No.: 18/058,053

(22) Filed: Nov. 22, 2022

(65) Prior Publication Data

US 2024/0168855 A1     May 23, 2024

(51) Int. Cl.
*G06N 20/00*            (2019.01)

(52) U.S. Cl.
CPC .................................... *G06N 20/00* (2019.01)

(58) Field of Classification Search
CPC .............................. G06N 20/00; G06N 5/022
See application file for complete search history.

(56) References Cited

U.S. PATENT DOCUMENTS

| | | | | |
|---|---|---|---|---|
| 2020/0364606 | A1* | 11/2020 | Sawant | G06N 20/00 |
| 2021/0326736 | A1* | 10/2021 | Kishimoto | G06F 18/217 |
| 2022/0067575 | A1* | 3/2022 | Saha | G06N 20/00 |
| 2022/0067576 | A1* | 3/2022 | Saha | G06F 16/24573 |
| 2022/0113964 | A1* | 4/2022 | Wang | G06F 8/73 |
| 2022/0138004 | A1* | 5/2022 | Nandakumar | G06N 5/01 |
| | | | | 718/102 |
| 2023/0059857 | A1* | 2/2023 | Dolby | G06F 11/0793 |
| 2023/0161945 | A1* | 5/2023 | Vadapandeshwara | |
| | | | | G06F 40/12 |
| | | | | 715/234 |

OTHER PUBLICATIONS

Jiang, "Elevating Jupyter Notebook Maintenance Tooling by Identifying and Extracting Notebook Structures", Oct. 2022 IEEE International Conference on Software Maintenance and Evolution. (Year: 2022).*

Sparks et al., "KeystoneML: Optimizing Pipelines for Large-Scale Advanced Analytics," Conference: 2017 IEEE 33rd International Conference on Data Engineering (ICDE), 12 pages.

"Elyra Documentation," https://elyra.readthedocs.io/en/stable/, accessed Sep. 26, 2022, 2 pages.

Fioravanzo, "Automating Jupyter Notebook Deployments to Kubeflow Pipelines with Kale," https://medium.com/kubeflow/automating-jupyter-notebook-deployments-to-kubeflow-pipelines-with-kale-a4ede38bea1f, Nov. 15, 2019, 4 pages.

(Continued)

*Primary Examiner* — Dave Misir
(74) *Attorney, Agent, or Firm* — Amin, Turocy & Watson, LLP

(57)            ABSTRACT

The described technology is generally directed towards automated development of machine learning pipelines. An automated framework can extract topics from a data science workspace such as a machine learning notebook, transform and annotate cells of the machine learning notebook to various machine learning pipeline stages, and orchestrate the machine learning pipeline stages in a workflow that can be deployed into production data infrastructures.

20 Claims, 11 Drawing Sheets

FIG. 4

(56)                    References Cited

OTHER PUBLICATIONS

Stiefel, "What's New in Azure Machine Learning?" InfoQ, https://www.infoq.com/news/2018/05/Azure-Machine-Learning-New/, May 9, 2018, 2 pages.
"DevOps Terminology: A Glossary," Plutora, https://www.plutora.com/devops-at-scale/terminology-glossary, accessed Sep. 26, 2022, 12 pages.
Baylor et al., "TFX: A TensorFlow-Based Production-Scale Machine Learning Platform," KDD'17, Aug. 13-17, 2017, Halifax, NS, Canada, 9 pages.
Lakshminarayan et al., "Enterprise-wide Machine Learning using Teradata Vantage: An Integrated Analytics Platform," 2019 IEEE International Conference on Big Data (Big Data), Dec. 9-12, 2019, 4 pages.

* cited by examiner

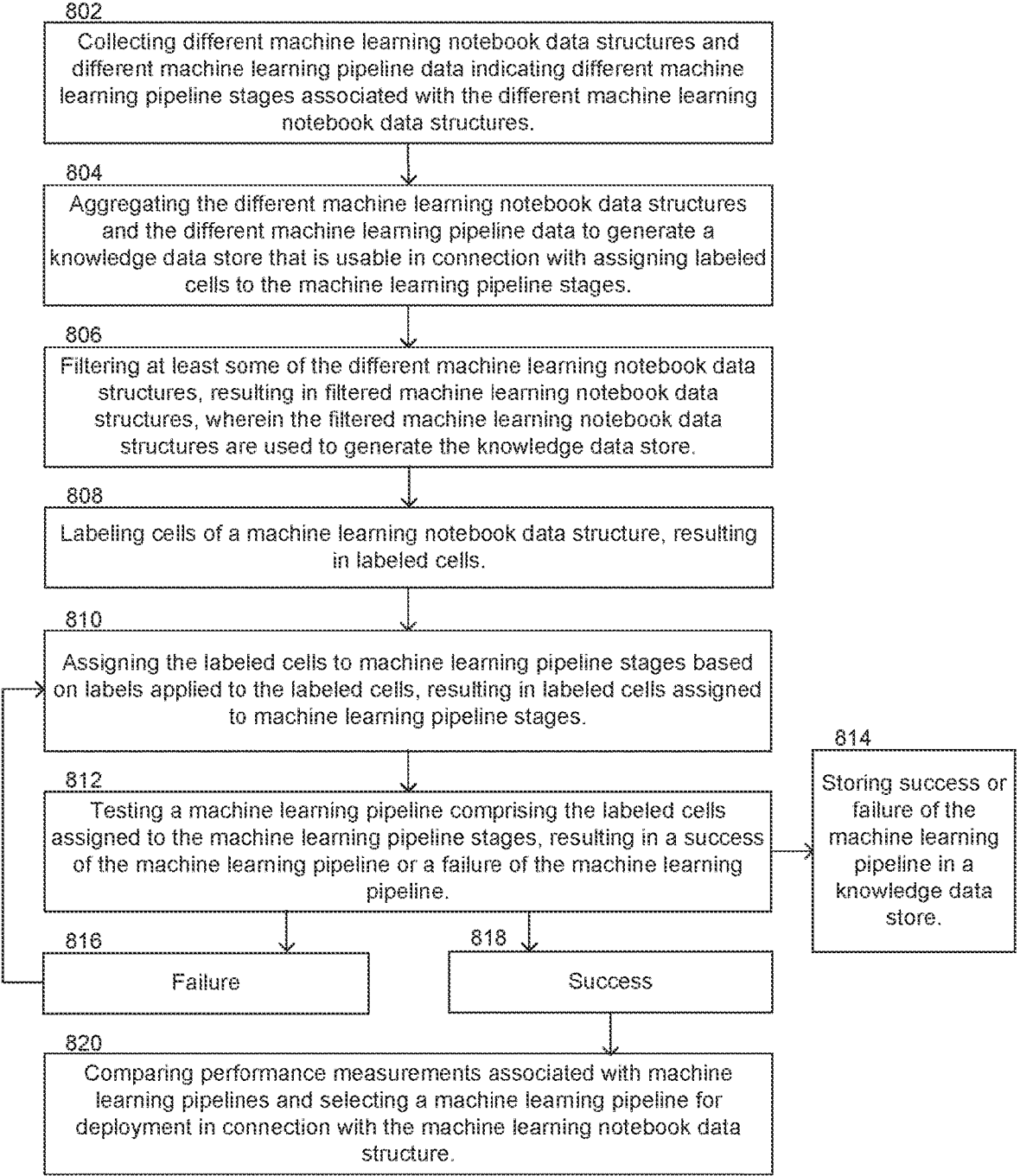

802
Collecting different machine learning notebook data structures and different machine learning pipeline data indicating different machine learning pipeline stages associated with the different machine learning notebook data structures.

804
Aggregating the different machine learning notebook data structures and the different machine learning pipeline data to generate a knowledge data store that is usable in connection with assigning labeled cells to the machine learning pipeline stages.

806
Filtering at least some of the different machine learning notebook data structures, resulting in filtered machine learning notebook data structures, wherein the filtered machine learning notebook data structures are used to generate the knowledge data store.

808
Labeling cells of a machine learning notebook data structure, resulting in labeled cells.

810
Assigning the labeled cells to machine learning pipeline stages based on labels applied to the labeled cells, resulting in labeled cells assigned to machine learning pipeline stages.

814
Storing success or failure of the machine learning pipeline in a knowledge data store.

812
Testing a machine learning pipeline comprising the labeled cells assigned to the machine learning pipeline stages, resulting in a success of the machine learning pipeline or a failure of the machine learning pipeline.

816
Failure

818
Success

820
Comparing performance measurements associated with machine learning pipelines and selecting a machine learning pipeline for deployment in connection with the machine learning notebook data structure.

FIG. 8

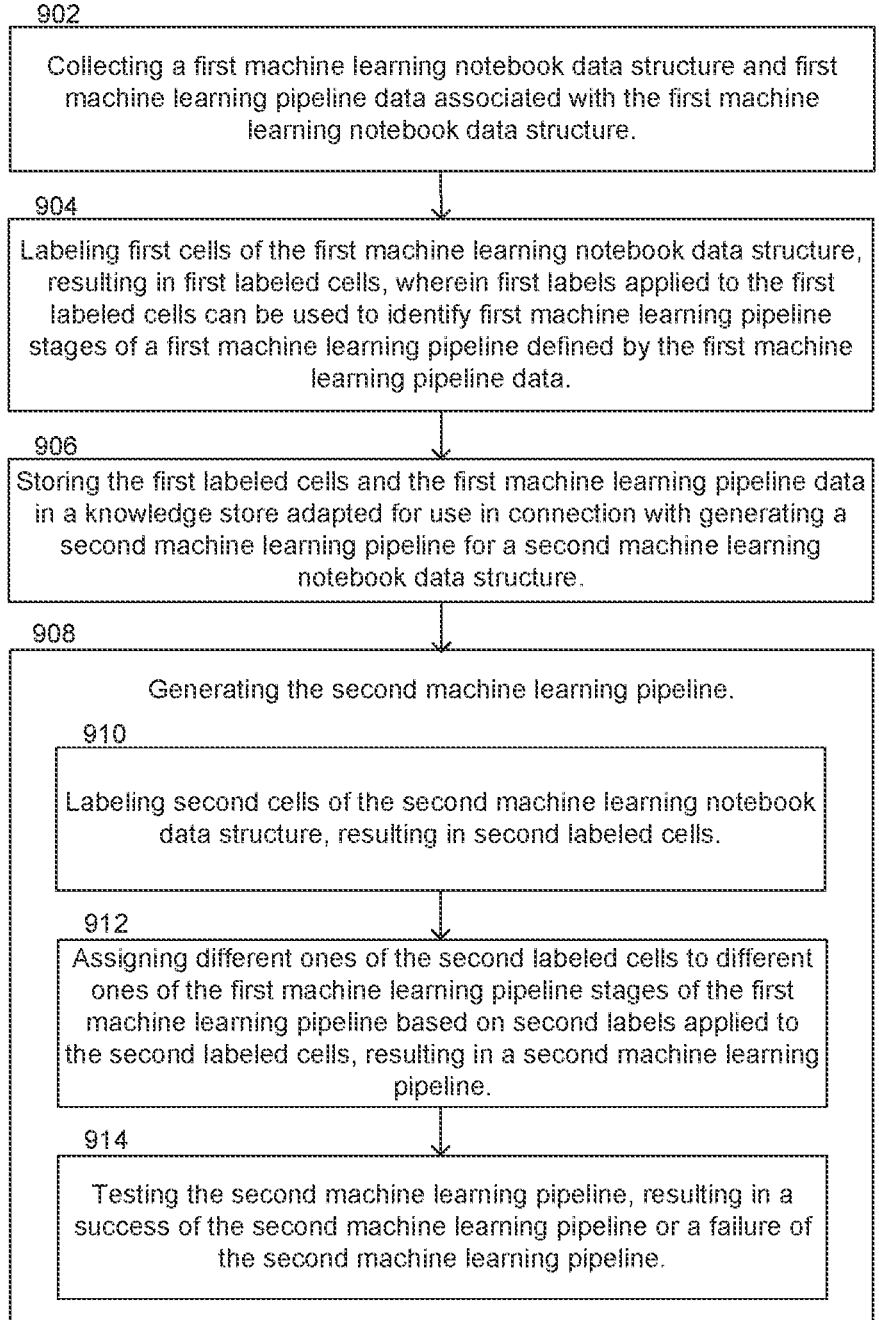

902

Collecting a first machine learning notebook data structure and first machine learning pipeline data associated with the first machine learning notebook data structure.

904

Labeling first cells of the first machine learning notebook data structure, resulting in first labeled cells, wherein first labels applied to the first labeled cells can be used to identify first machine learning pipeline stages of a first machine learning pipeline defined by the first machine learning pipeline data.

906

Storing the first labeled cells and the first machine learning pipeline data in a knowledge store adapted for use in connection with generating a second machine learning pipeline for a second machine learning notebook data structure.

908

Generating the second machine learning pipeline.

910

Labeling second cells of the second machine learning notebook data structure, resulting in second labeled cells.

912

Assigning different ones of the second labeled cells to different ones of the first machine learning pipeline stages of the first machine learning pipeline based on second labels applied to the second labeled cells, resulting in a second machine learning pipeline.

914

Testing the second machine learning pipeline, resulting in a success of the second machine learning pipeline or a failure of the second machine learning pipeline.

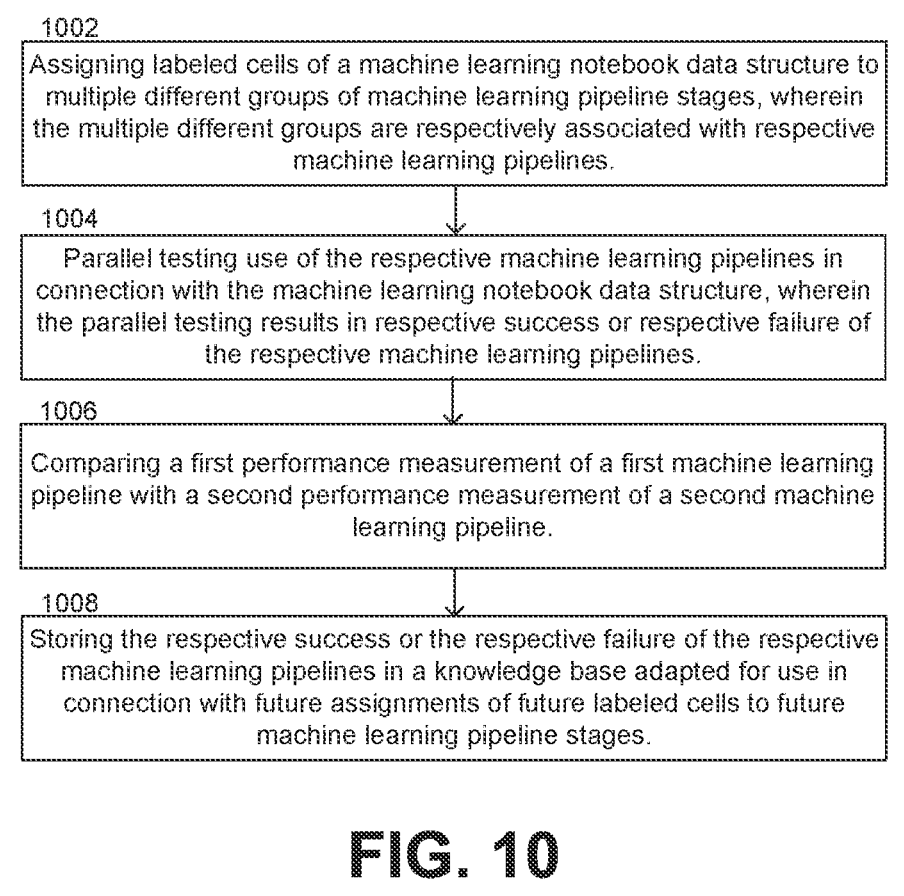

Assigning labeled cells of a machine learning notebook data structure to multiple different groups of machine learning pipeline stages, wherein the multiple different groups are respectively associated with respective machine learning pipelines.

1004

Parallel testing use of the respective machine learning pipelines in connection with the machine learning notebook data structure, wherein the parallel testing results in respective success or respective failure of the respective machine learning pipelines.

1006

Comparing a first performance measurement of a first machine learning pipeline with a second performance measurement of a second machine learning pipeline.

1008

Storing the respective success or the respective failure of the respective machine learning pipelines in a knowledge base adapted for use in connection with future assignments of future labeled cells to future machine learning pipeline stages.

FIG. 10

MACHINE LEARNING PIPELINE AUTOMATION

BACKGROUND

Data analytics is rapidly growing across all industries. Having proper data analytics, data processing and data visualization tools has become more important than ever.

Machine learning models are increasingly important for data analytics, data processing and data visualization. However, machine learning model development is complex and can involve significant resources. With the right tools, data scientists can develop machine learning models more efficiently.

Machine learning development and training can be facilitated by the use of machine learning notebooks. For example, Project Jupyter is an open-source project which has developed a notebook tool called "Jupyter Notebooks." Machine learning notebooks employ kernels and cells to help organize and run steps found in a machine learning project, such as fetching data, transforming data, training a machine learning model, and persisting the machine learning model.

After a data scientist is satisfied with results of a machine learning notebook, the data scientist may struggle to transition their code into a high-performance, reliable machine learning pipeline. A machine learning pipeline provides a bridge from development to production of machine learning and artificial intelligence projects. Machine learning pipelines help automate machine learning workflows by processing and integrating datasets into a model, which can then be evaluated and delivered to production. For example, machine learning pipelines can handle training, serving, monitoring, and orchestrating of models on data infrastructures.

The above-described background is merely intended to provide a contextual overview of some current issues and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which:

FIG. 8 is a flow diagram of a first example, non-limiting computer implemented method employed in connection with automated generation of machine learning pipelines, in accordance with one or more embodiments described herein.

FIG. 9 is a flow diagram of a second example, non-limiting computer implemented method employed in connection with automated generation of machine learning pipelines, in accordance with one or more embodiments described herein.

FIG. 10 is a flow diagram of a third example, non-limiting computer implemented method employed in connection with automated generation of machine learning pipelines, in accordance with one or more embodiments described herein.

DETAILED DESCRIPTION

Figure 1:
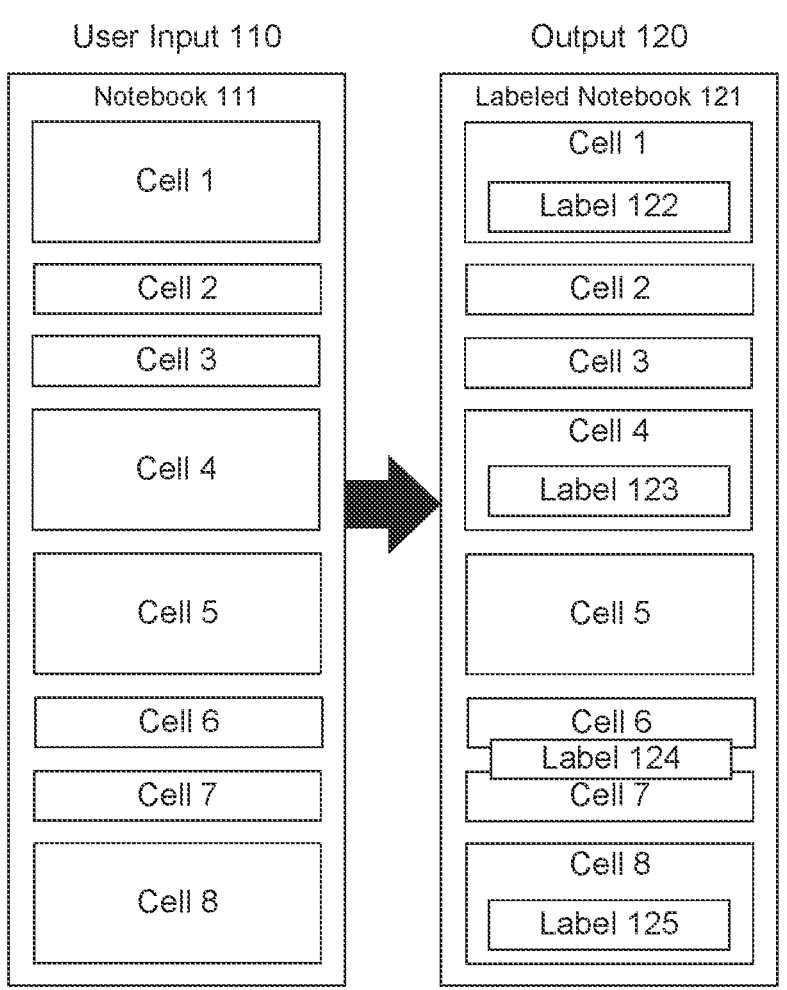
FIG. 1 illustrates example labeling of cells of a machine learning notebook data structure, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The subject application generally relates to computer hardware and software, for example, to tools for developing software that incorporates machine learning, and related embodiments. Example embodiments are directed towards automated development of machine learning pipelines. An automated framework can extract topics from a data science workspace such as a machine learning notebook, transform and annotate cells of the machine learning notebook to various machine learning pipeline stages, and orchestrate the machine learning pipeline stages in a workflow that can be deployed into production data infrastructures. Further aspects and embodiments of this disclosure are described in detail below.

Some embodiments of this disclosure can facilitate transitions from notebooks to pipelines, in order to effect seamless or near-seamless transitions by extracting pipelines from notebooks. Embodiments can operate as notebooks are written and saved to disk, i.e., simultaneously with notebook creation and storage.

Figure 2:
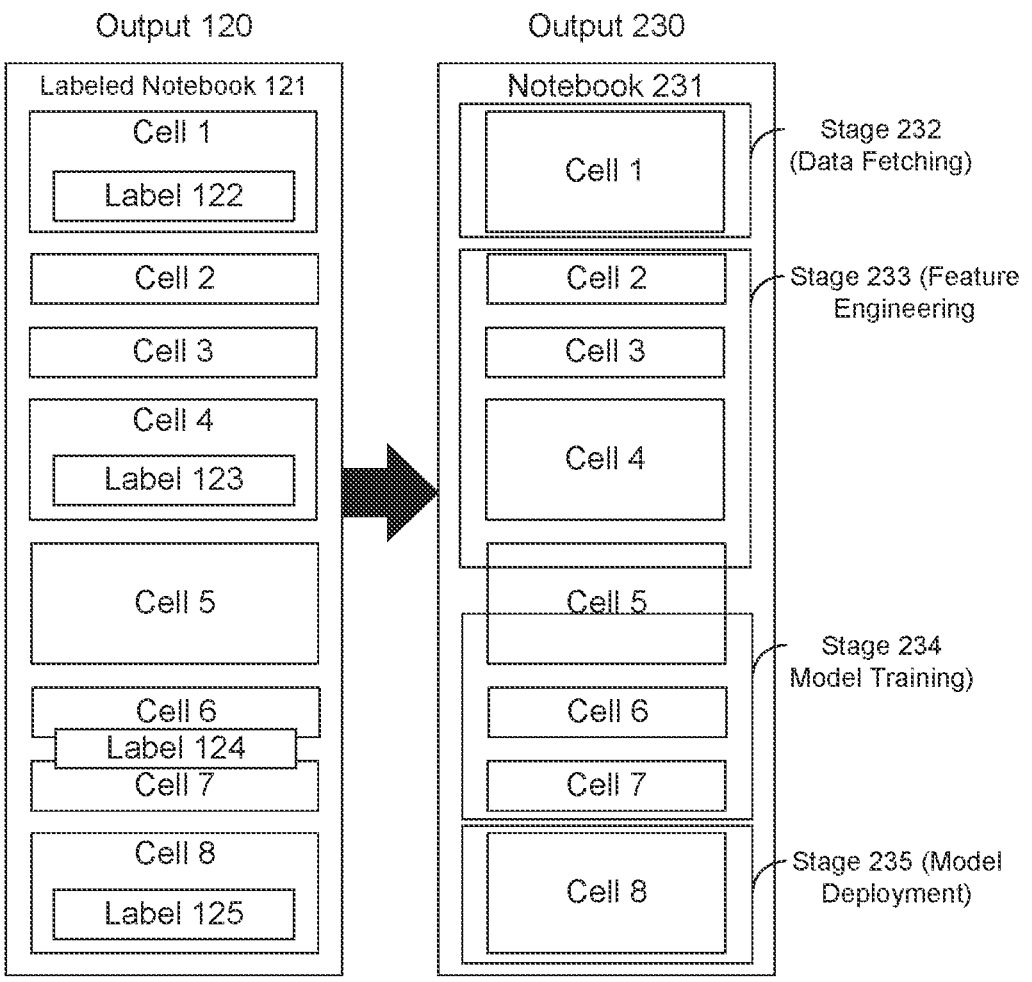
FIG. 2 illustrates example assigning of labeled cells to machine learning pipeline stages based on labels applied to the labeled cells, in accordance with one or more embodiments described herein.
Figure 3:
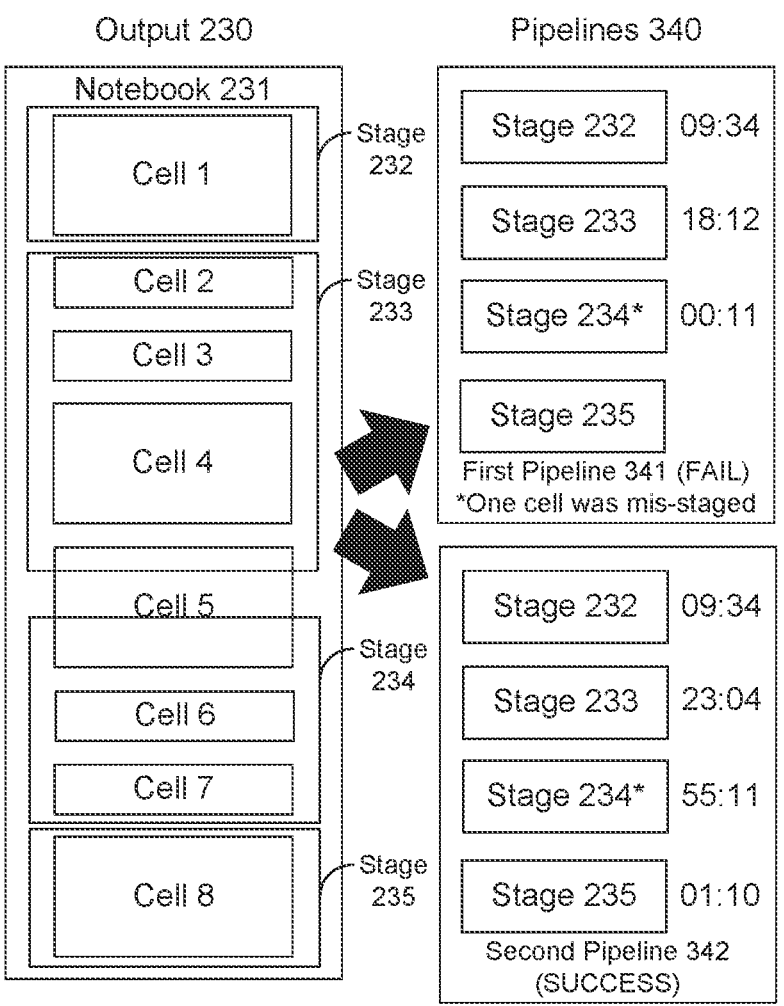
FIG. 3 illustrates example testing of a machine learning pipeline comprising the labeled cells assigned to the machine learning pipeline stages, resulting in a success of the machine learning pipeline or a failure of the machine learning pipeline, in accordance with one or more embodiments described herein.

Embodiments of this disclosure can automate the pipeline generation process. FIGS. 1-3 illustrate example operations in accordance with one or more embodiments described herein. FIG. 1 illustrates example labeling of cells of a machine learning notebook data structure. FIG. 1 includes a user input 110 in the form of a notebook 111. The notebook 111 comprises example cells, including cell 1, cell 2, cell 3, cell 4, cell 5, cell 6, cell 7, and cell 8. The notebook 111 can be automatically labeled, as described herein, resulting in an output 120 comprising, e.g., a labeled notebook 121. The labeled notebook 121 can comprise the cells 1-8 and any other properties of the input notebook 111, as well as labels, e.g., example labels 122, 123, 124, and 125, which are associated with the cells 1-8. In FIG. 1, label 122 is associated with cell 1, label 123 is associated with cell 4, label 124 is associated with cell 6, and label 125 is associated with cell 8.

Figure 4:
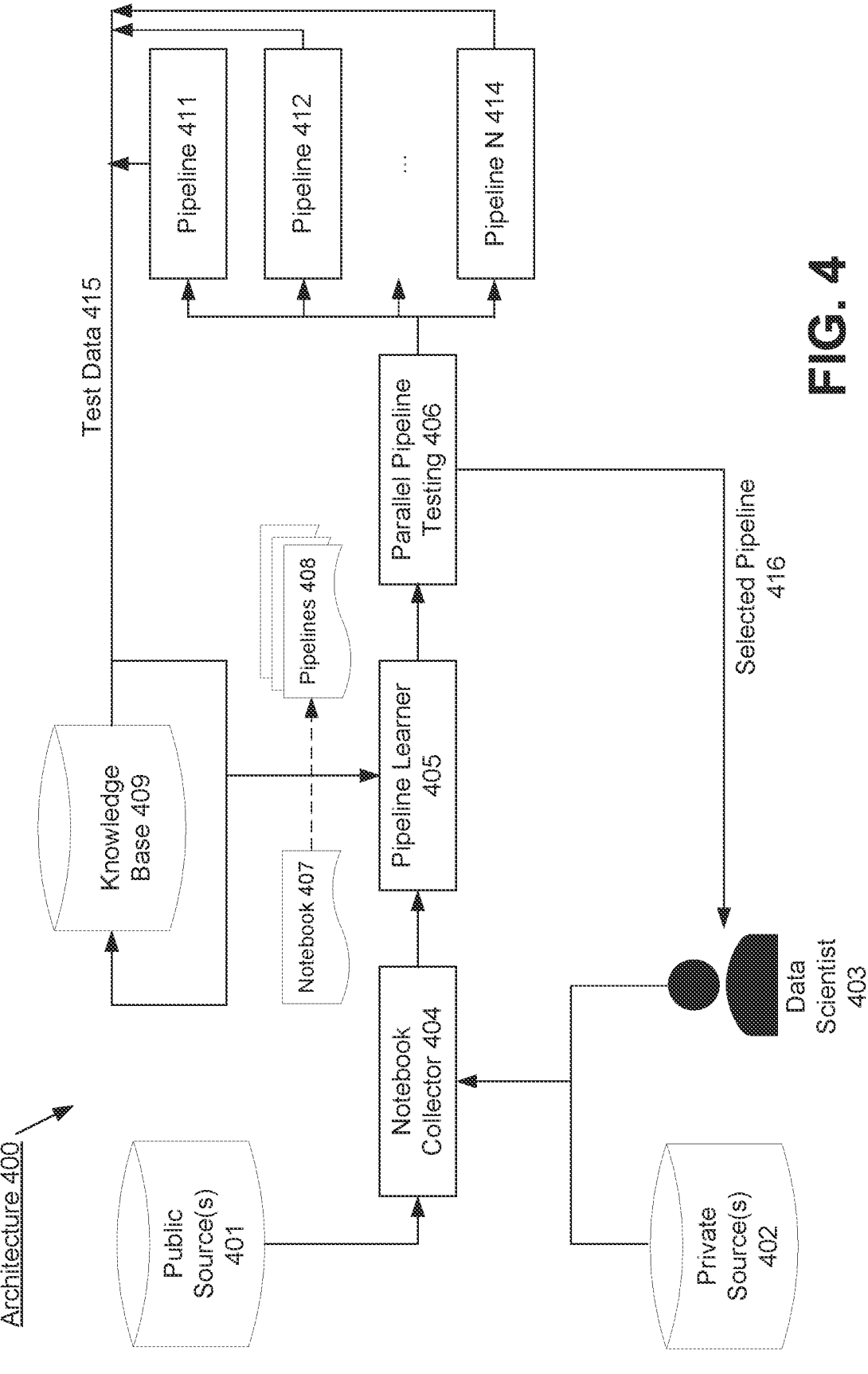
FIG. 4 illustrates an example architecture for automated extraction and testing of machine learning pipelines, in accordance with one or more embodiments described herein.

The example label 122 can comprise, e.g., {"db_connectors":True, "csv_upload": True, ... }. The example label 123 can comprise, e.g., {"spark": True, "pandas_new_cols": True, "engineering_prefix":True}. The example label 123 can comprise, e.g., {"model_fit": True, "grid_search": True,}. The example label 125 can comprise, e.g., {"api_library": "flask}. In some embodiments, the labeled notebook 121 can be a result of streamlined extraction of cells 1-8 running on Jupyter notebooks and hosted on local workstations or on a public cloud, and annotation of labels 122-125. The labels 122-125 can be automatically generated and captured in a knowledge base, such as illustrated in FIG. 4.

FIG. 2 illustrates example assigning of labeled cells to machine learning pipeline stages based on labels applied to the labeled cells, in accordance with one or more embodiments described herein. FIG. 2 comprises the output 120 introduced in FIG. 1, which includes the labeled notebook 121 and cells 1-8 with associated labels 122-125. The output 120 can be processed to generate an output 230. The output 230 can comprise, e.g., a notebook 231 in which cells 1-8 are assigned to different stages, e.g., to example stages 232, 233, 234 and 235. The output 230 can comprise an output of a stage selection process applied to a labeled notebook 121. Some embodiments may generate multiple different outputs 230, wherein the different outputs 230 can differ from notebook 231 by having different cells 1-8 assigned to different stages 232, 233, 234 and 235. These different outputs can be tested in parallel, as described further in connection with FIG. 3.

Stage 232 can comprise, e.g., a data fetching stage, and in the illustrated example cell 1 can be assigned to stage 232. Stage 233 can comprise, e.g., a feature engineering stage, and in the illustrated example cells 2, 3, 4, and a portion of cell 5 can be assigned to stage 233. Stage 234 can comprise, e.g., a model training stage, and in the illustrated example cells 6, 7, and a portion of cell 5 can be assigned to stage 234. Stage 235 can comprise, e.g., a model deployment stage, and in the illustrated example cell 8 can be assigned to stage 235.

FIG. 3 illustrates example testing of machine learning pipelines comprising the labeled cells assigned to the machine learning pipeline stages, resulting in a success of the machine learning pipeline or a failure of the machine learning pipeline, in accordance with one or more embodiments described herein. FIG. 3 comprises the output 230 introduced in FIG. 3, which includes, for example, the notebook 231 in which cells 1-8 are assigned to example stages 232, 233, 234 and 235, optionally along with other different notebooks included in the output 230. The output 230 can be processed by testing various pipelines 340 based on the output 230. For example, a first pipeline 341 and a second pipeline 342 can be tested. The tests can optionally be performed in parallel.

In the illustrated example, a test of the first pipeline 341 resulted in a failure of the machine learning pipeline 341. Log data generated in connection with testing the first pipeline 341 can include performance information, e.g., the execution times of various stages 232-235, as well as error identifications, e.g., an indication that a cell, e.g., cell 5, was mis-staged at stage 234. The log data can be stored in a knowledge base for use in future pipeline generation and testing operations.

A test of the second pipeline 342 resulted in a success of the machine learning pipeline 342. Log data generated in connection with testing the second pipeline 342 can include performance information, e.g., the execution times of various stages 232-235. The log data can be stored in a knowledge base for use in future pipeline generation and testing operations. Furthermore, the performance information can be compared with performance of any other successful pipelines of pipelines 340, to allow for selection of a higher or highest performing (as well as successful) pipeline for deployment in connection with the notebook 111.

FIG. 4 illustrates an example architecture for automated extraction and testing of machine learning pipelines, in accordance with one or more embodiments described herein. The example architecture 400 can be used to process the inputs and outputs described with reference to FIGS. 1-3. The example architecture 400 comprises public sources 401 and private sources 402 of notebooks for collection by a notebook collector 404. A data scientist 403 can interact with the private sources 404, e.g., by saving a notebook to private sources 404.

The example architecture 400 further comprises a pipeline learner 405 configured to process collected notebooks (collected by the notebook collector 404) by parsing and storing notebook information in a knowledge base 409. The pipeline learner 405 can further be configured to process an input notebook 407 to generate pipelines 408. The input notebook 407 can implement, e.g., the notebook 111 illustrated in FIG. 1, and the pipelines 408 can implement the pipelines 340 illustrated in FIG. 3.

The example architecture 400 further comprises parallel pipeline testing 406. Parallel pipeline testing 406 can be configured to test pipelines 408, wherein pipelines 408 can comprise, e.g., pipeline 411, pipeline 412, . . . , pipeline N 414. Test data 415 can include success/failure information and performance information which can be included in an error log for each pipeline test. The test data 415 can be stored in the knowledge base 409. The test data 415 can furthermore be used to identify a selected pipeline 416. The selected pipeline 416 can comprise, e.g., the pipeline 412 or any other successful pipeline. The selected pipeline 416 can optionally comprise a pipeline having faster performance than one or more other tested pipelines. The selected pipeline 416 can be identified to the data scientist 403, so that the data scientist can initiate deployment of the selected pipeline 416 in connection with the notebook 407. In some embodiments, the selected pipeline 416 can comprise a list of pipelines that fit minimum acceptance criteria, ordered by performance. The list can be in a format that can be converted to run tools, such as Airflow or Argo.

In example operations according to FIG. 4, first, the notebook collector 404 can be configured to continuously scan internal and external repositories such as private sources 402 and public sources 401 for notebooks with topics on data science, artificial intelligence, and machine learning. Next, the pipeline learner 405 can be configured to parse and scan collected notebooks for knowledge that helps determine different tasks as well as the relationship among the tasks and inherent performance of the tasks. The resulting pipeline information can be stored in the knowledge base 409.

In order to automatically generate a pipeline for an input notebook 407, the pipeline learner 405 can be configured to process the notebook 407 according to FIG. 1 and FIG. 2, by labeling the notebook 407 and assigning labeled cells to pipeline stages, wherein the labels and pipeline stages are assigned based on pipeline candidates 408 in the knowledge base 409. The pipeline candidates 408 can be based on pipelines for collected notebooks in knowledge base 409 which have one or more determined similarities or identical properties in comparison to the notebook 407.

Parallel pipeline testing 406 can be configured to test pipelines 408 in parallel. For example, parallel pipeline testing 406 can be configured to test pipelines 408 according to FIG. 3. Test data 415 comprising results of each pipeline run/test can be stored in the knowledge base 409 and used to either strengthen or weaken knowledge acquired in previous test runs.

In some embodiments, the architecture 400 can implement an automated end-to-end framework to automatically extract topics in data science workspaces, such as notebooks, transform and annotates the cells of a notebook to various stages of machine learning lifecycles, and finally orchestrate the cells according to a workflow that can be deployed into production data infrastructures. The architecture 400 can comprise an engine and a framework with three intertwined, never-ending services, namely the notebook collector 404, the pipeline learner 405, and the parallel pipeline testing 406. Example implementations of the notebook collector 404, the pipeline learner 405, and the parallel pipeline testing 406 are described further in connection with FIG. 5, FIG. 6, and FIG. 7, respectively.

Figure 5:
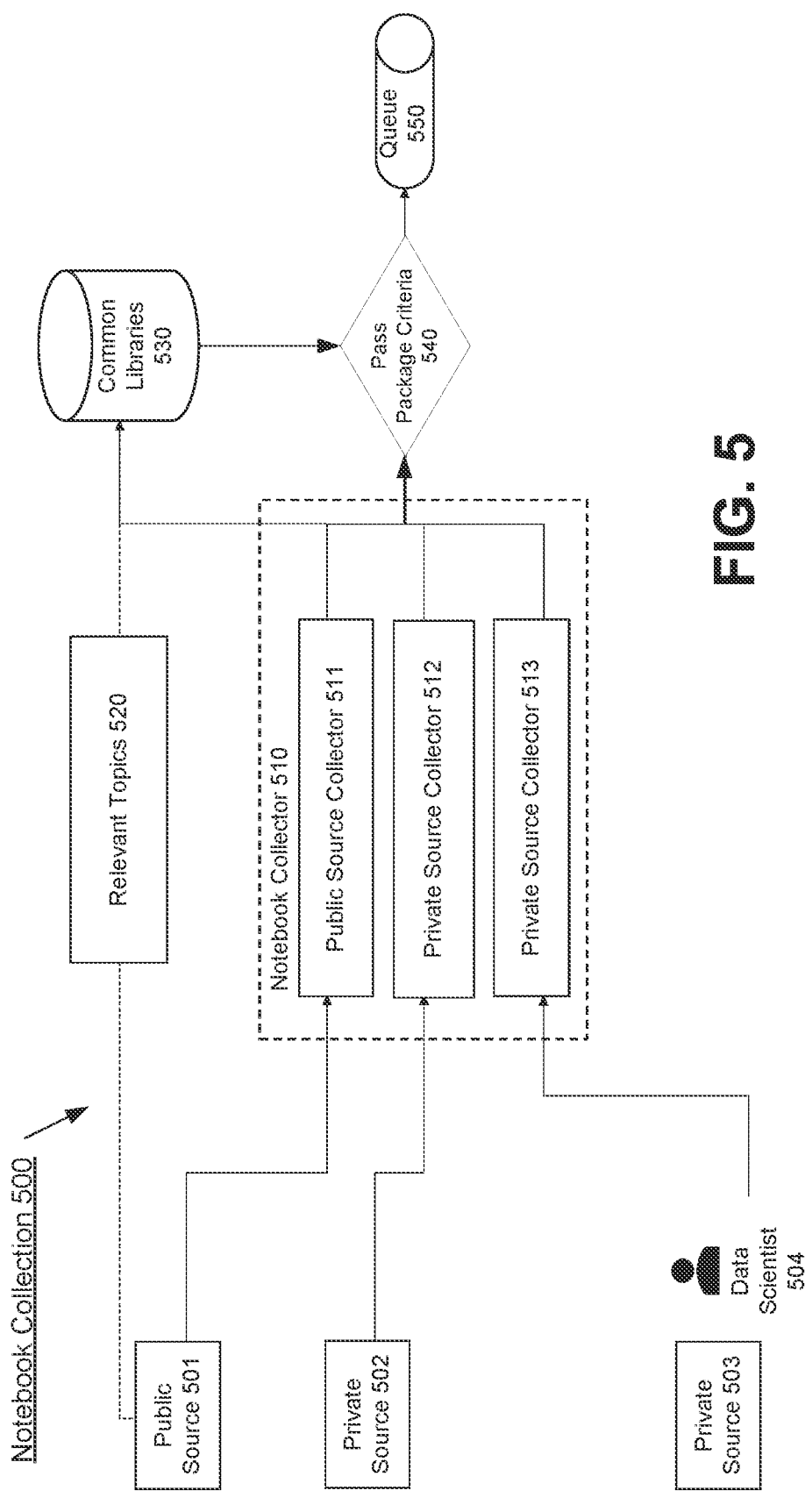
FIG. 5 illustrates an example architecture and operations of a notebook collector which can be included in the architecture introduced in FIG. 4, in accordance with one or more embodiments described herein.

FIG. 5 illustrates an example architecture and operations of a notebook collector which can be included in the architecture introduced in FIG. 4, in accordance with one or more embodiments described herein. The example notebook collection 500 can implement the notebook collector 404 introduced in FIG. 4 in some embodiments. Notebook collection 500 can involve operations by notebook collector 510 to collect notebooks from notebook sources such as public source 501, private source 502, and private source 503.

The public source 501 can comprise, e.g., a public Github. A public source collector 511, such as a Github application programming interface (API), can be used periodically (such as daily) to retrieve notebooks from repositories with relevant topics. Relevant topics can be defined by relevant topics 520.

The private source 502 can comprise, e.g., a private Gitlab. A private source collector 512, such as a Gitlab webhook can be used to search Gitlab repositories and retrieve notebooks in every "push" made in the Gitlab. While private source collector 512 can retrieve some unlikely candidates, the private source collector 512 can eventually discover notebooks associated with recently started data science, AI, and ML projects.

The private source 503 can comprise, e.g., an intelligent development environment (IDE) on a private cloud vendor platform, such as VMWare. The private source collector 513, such a watchdog process on a working directory, can be used to retrieve notebooks from the private cloud. An example data scientist 504 can save a notebook to the private source 503, which can trigger the watchdog process 513. Given some users 504 don't use code management tools such as Gitlab, the watchdog process 513 can watch for any file event on the path the data scientist 504 is working on. Whenever a notebook is saved, the notebook can be evaluated and optionally sent to a queue 550.

In some embodiments, each of the source datasets 501, 502, 503 can have a corresponding service 511, 512, 513, as illustrated in FIG. 5. The services 511, 512, 513 can be configured to analyze notebooks and categorize whether the topics presented in a notebook are related to relevant topics 520 such as machine learning, deep learning, neural networks or artificial intelligence. Embodiments can be configured to include custom sets of relevant topics 520 and the relevant topics 520 can be used across the different source variants 501, 502, and 503.

FIG. 5 further comprises common libraries 530, pass package criteria 540, and a queue 550. After notebook collection, artifacts collected from sources 501, 502, and 503, alongside the relevant topics 520 and data science, AI and ML common libraries 530, can be combined in a next processing phase performed by notebook collection 500. The common libraries 530 can comprise a list of the top X libraries most commonly found on notebooks from repositories with relevant topics, where X is any positive whole number. The below table provides an example of library data that can be included in the common libraries 530:

| Library | # Used |
|---|---|
| Pandas | 900k |
| scikit-learn | 500k |
| Tensorflow | 200k |
| . . . | . . . |

Figure 6:
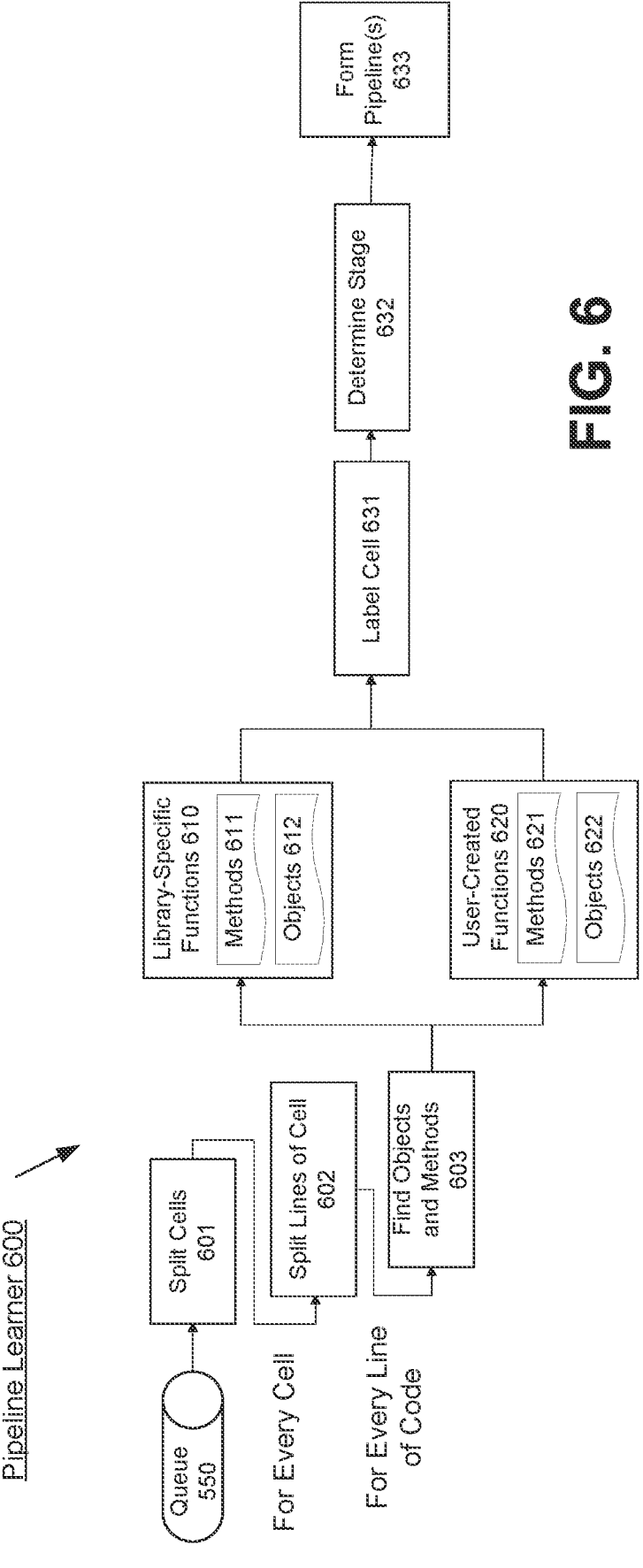
FIG. 6 illustrates an example architecture and operations of a pipeline learner which can be included in the architecture introduced in FIG. 4, in accordance with one or more embodiments described herein.

Before sending a notebook to the pipeline learner 600 illustrated in FIG. 6, notebook collection 500 can be configured to evaluate imported notebook packages and common libraries 530, and at least one of the common libraries 530 can be determined to be part of a continuously maintained list of data science, AI, and ML common libraries. Finally, at pass package criteria 540, when package criteria applicable to collected notebooks are passed, then passing notebooks can be placed in the queue 550 of potential notebooks for in transforming and extracting notebooks into pipelines.

FIG. 6 illustrates an example architecture and operations of a pipeline learner which can be included in the architecture introduced in FIG. 4, in accordance with one or more embodiments described herein. The example pipeline learner 600 can implement the pipeline learner 405 introduced in FIG. 4. The example pipeline learner 600 can include the queue 550 introduced in FIG. 5, split cells 601, split lines of cell 602, find objects and methods 603. Outputs of find objects and methods 603 can include, e.g., library-specific functions 610 comprising methods 611 and objects 612, and user-created functions 620 comprising methods 621 and objects 622. Further components of the example pipeline learner 600 include label cell 631, determine stage 632, and form pipeline(s) 633.

The example pipeline learner 600 can comprise a puzzle solver service configured to retrieve the potential notebooks for pipeline extraction from the queue 500. For each retrieved notebook, the split cells 601 function can split every cell present within the notebook, resulting in multiple individual cells that are split from one another. After splitting the cells, split lines of cell 602 can parse the lines of code within the cells, resulting in multiple individual lines of code. For every line of code output from split lines of cell 602, find objects and methods 603 can read objects and methods referenced in the line of code.

Scraping the objects and methods that are present in a notebook can enable classification of the artifacts in a method as library-specific functions 610, or user-created functions 620. Library-specific methods 611 are methods which are used to assign a propensity of a block of code pertaining to each pipeline stage, such as fetching data, importing package, transforming data, etc. User-created methods 621 on the other hand, are methods that can be used to enrich prefixes, roots, and suffixes in a knowledge base 409 for future pipelines.

Label cell 631 can be configured to enrich cells with metadata such as libraries and connectors. These categorization techniques can be used to label every cell present in the notebooks, thus consequently enabling determine stage 632 to assign cells to different stages of a pipeline.

Based on a cell's labels and previous knowledge, determine stage 632 can assign a cell to a stage, thereby enabling formulating of pipelines by form pipeline(s) 633. After the pipelines are generated by form pipeline(s) 633, artifacts can be sent to a queue 701 (see FIG. 7) for testing and verifying if the stages of the pipelines/workflows are accurate or not.

Figure 7:
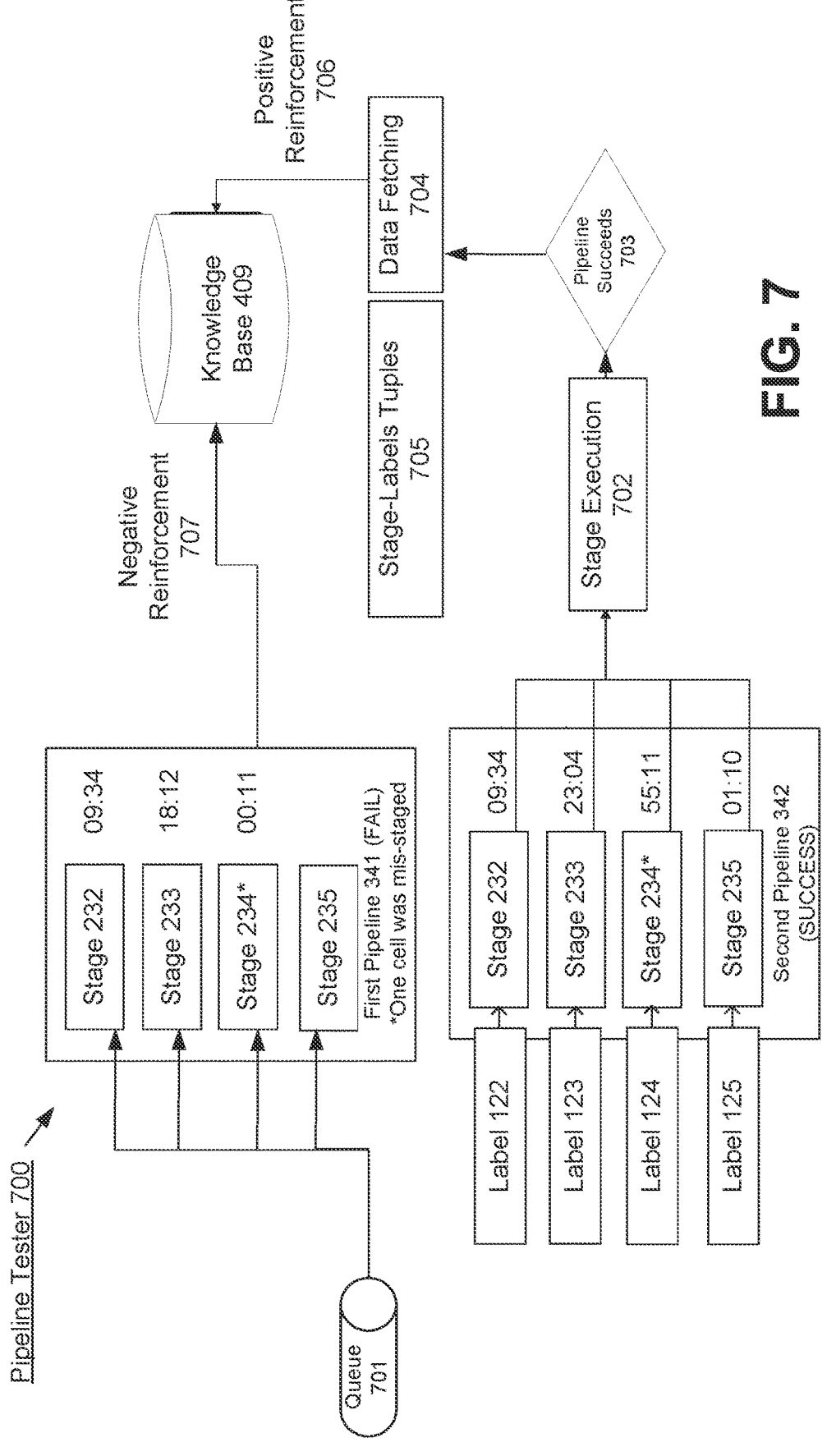
FIG. 7 illustrates an example architecture and operations of a pipeline tester which can be included in the architecture introduced in FIG. 4, in accordance with one or more embodiments described herein.

FIG. 7 illustrates an example architecture and operations of a pipeline tester which can be included in the architecture introduced in FIG. 4, in accordance with one or more embodiments described herein. The example pipeline tester 700 can implement the parallel pipeline testing 406 introduced in FIG. 4.

The example pipeline tester 700 can include a queue 701 comprising different pipelines for testing. In a parallel pipeline testing phase, the pipeline tester 700 can be configured to retrieve the potential pipelines, e.g., the first pipeline 341 and the second pipeline 342, from the queue 701. The pipeline tester 700 can run experiments on the potential pipelines 341, 342 in parallel. The experiments can be configured validate if a potential pipeline 341, 342 meets an end goal (SUCCESS) or not (FAILURE). As every pipeline stage of a pipeline in the queue 701 comes with labels assigned to its cells as inputs, e.g., labels 122-125 are assigned to cells in stages 232-235, embodiments can be configured to map if a particular entry on a cell is part of a data fetching stage 232, a feature engineering stage 233, model training stage 234 a or model deployment stage 235.

If any cells of a pipeline, e.g., first pipeline 341, are mis-staged, testing data such as an error log can be captured as negative reinforcement in the knowledge base 409 so that the cell is less likely to be mis-staged in the future. This negative reinforcement technique can be used to teach specific behaviors pertaining to pipeline orchestration and building so that false positives and negative parameters can be caught and discarded in advance.

Components of the pipeline tester 700 can interact to detect and validate machine learning pipelines. The stage execution 702 can execute the stages 232-235 to determine whether the stages 232-235 are accurately configured, leading to success at pipeline succeeds 703, e.g. the success of second pipeline 342. In response to a success at 703, data fetching 704 can feed a positive reinforcement 706 back to the knowledge base 409 to comprehend the reasons for successfully running the pipeline 342. This is referred to herein as a positive reinforcement technique. Data fetching 704 can furthermore capture stage-labels tuples 705 and store the stage-labels tuples 705 in the knowledge base 409. Stages 232-235 can optionally be run as containers and timed so that embodiments can evaluate the overall performance of the pipelines after deploying them to production.

In some embodiments, stages 232-235 can be deployed into production environments. Credentials to securely access various components of an infrastructure can be stored in a key-value store. The images for provisioning workspaces, images, pipelines, etc. can be stored in a registry service. Interactions between components in a shared API can be secured using an identity platform. With best continuous integration, continuous delivery (CI/CD) practices enforced while deploying and delivering feature improvements for each module, the process of handling vulnerabilities on the deployed packages can be seamless and can be leveraged to maintain changes in the infrastructure.

Returning to the architecture 400 illustrated in FIG. 4, some embodiments of this disclosure can be configured to collect publicly available notebooks on the Internet, which fit a criterion of a valid notebook for machine learning. Pipeline validation and persistence can optionally be performed in response to a data scientist 403 saving a notebook to disk.

Embodiments can furthermore optionally implement a never-ending event-driven service that parses and interprets collected notebooks. The service can annotate labels to key words' parts (prefix+root+suffix) as well as assign metadata to entire blocks of code, defining not only which pipeline task a particular block of code would fit into, but also whether that task could run in parallel with another group of tasks, as well as its confidence execution level, as derived from previous knowledge acquired.

A pipeline learner knowledge base 409 can be maintained using positive and negative reinforcement techniques and can comprise multiple artifacts that can classify whether a machine learning pipeline will succeed or not, with current automated labels.

The parallel pipeline tester 406 can be configured to build one or more pipelines seamlessly for every notebook as an input. Embodiments can also comprise a framework for parallel launching of various pipelines, thus probing for failures and performance issues, and ultimately ranking the pipeline candidates for a data scientist based on pipeline performance data.

Embodiments of this disclosure may be advantageous for deployment by large-scale enterprises who recognize that gathering application intelligence is an integral part of data analytics operations. Having a simple unified configuration for users to orchestrate reusable components (data analysis and transformation, data validation, model training, model evaluation and validation, and serving infrastructure) effectively facilitates delivering business value and better accommodates new innovations from the machine learning community.

FIG. 8 is a flow diagram of a first example, non-limiting computer implemented method employed in connection with automated generation of machine learning pipelines, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 8 can be performed by equipment implementing an architecture 400 such as illustrated in FIG. 4. Operations 802, 804 and 806 can be performed, e.g., by notebook collector 404. Operation 802 comprises collecting, different machine learning notebook data structures and different machine learning pipeline data indicating different machine learning pipeline stages associated with the different machine learning notebook data structures. Operation 804 comprises aggregating the different machine learning notebook data structures and the different machine learning pipeline data to generate a knowledge data store, e.g., knowledge base 409, that is usable in connection with assigning labeled cells to the machine learning pipeline stages. Operation 806 comprises filtering at least some of the different machine learning notebook data structures, resulting in filtered machine learning notebook data structures, wherein the filtered machine learning notebook data structures are used to generate the knowledge data store 409.

Operations 808 and 810 can be performed, e.g., by pipeline learner 405. Operation 808 comprises labeling cells of a machine learning notebook data structure, resulting in labeled cells. For example, see the labeled cells 1-8 illustrated in FIG. 1. Operation 810 comprises assigning the labeled cells 1-8 to machine learning pipeline stages 232-235, as illustrated in FIG. 2, based on labels 122-125 applied to the labeled cells 1-8, resulting in labeled cells 1-8 assigned to machine learning pipeline stages 232-235.

In some embodiments, assigning the labeled cells 1-8 to the machine learning pipeline stages 232-235 at operation 810 can comprise assigning the labeled cells 1-to multiple different groups of the machine learning pipeline stages, wherein a different group of the multiple different groups is associated with a different machine learning pipeline, e.g., pipeline 341 or pipeline 342, of different machine learning pipelines 340. The labeled cells 1-8 can be assigned to different stages 232-235 in different pipelines 341, 342 to be tested.

Operation 812 can be performed, e.g., by parallel pipeline testing 406. Operation 812 comprises testing a machine learning pipeline, e.g., pipeline 341 or 342 comprising the labeled cells 1-8 assigned to the machine learning pipeline stages 232-235, resulting in a success of the machine learning pipeline 341 or 342 or a failure of the machine learning pipeline 341 or 342. In some embodiments, testing the machine learning pipeline at operation 812 can comprise parallel testing of different machine learning pipelines 341 and 342.

Operation 816 indicates testing the machine learning pipeline, e.g., pipeline 341, resulted in the failure of the machine learning pipeline 341. In response to the failure of the machine learning pipeline 314 at 816, the method can return to operation 810, for example, by re-assigning, at 810, a labeled cell of the labeled cells 1-8 to a different machine learning pipeline stage 232-235 of the machine learning pipeline stages 232-235, resulting in a reconfigured machine learning pipeline, and testing at 812, the reconfigured machine learning pipeline, resulting in a success of the reconfigured machine learning pipeline or a failure of the reconfigured machine learning pipeline. Re-assigning the labeled cell at 810 can be based on an error log generated in connection with testing the machine learning pipeline 341.

Operation 818 indicates testing the machine learning pipeline, e.g., pipeline 342, resulted in the success of the machine learning pipeline 342. The success of the machine learning pipeline 342 at 818 can further result in performance data representative of a performance measurement associated with the machine learning pipeline 342. The performance measurement can comprise, e.g., a time measurement indicative of an execution time for the machine learning pipeline 342 to execute.

When multiple machine learning pipelines succeed, operation 820 can be performed to compare the resulting performance data. Operation 820 comprises comparing performance measurements associated with machine learning pipelines and selecting a machine learning pipeline for deployment in connection with the machine learning notebook data structure.

Regardless of success or failure, operation 814 can be performed. Operation 814 comprises storing success or failure of the machine learning pipeline in a knowledge data store such as 409. The knowledge data store 409 can be usable in connection with future assignments of future labeled cells to future machine learning pipeline stages.

FIG. 9 is a flow diagram of a second example, non-limiting computer implemented method employed in connection with automated generation of machine learning pipelines, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 9 can be performed by equipment implementing an architecture 400 such as illustrated in FIG. 4. Operation 902 can be performed, e.g., by notebook collector 404. Operation 902 comprises collecting a first machine learning notebook data structure, e.g., notebook 111, and first machine learning pipeline data associated with the first machine learning notebook data structure 111. In some embodiments, collecting the first machine learning notebook data structure 111 can comprise collecting multiple machine learning notebook data structures and filtering at least some of the multiple machine learning notebook data structures. In some embodiments, collecting the multiple machine learning notebook data structures can comprise collecting machine learning notebook data structures from a public data store 401 and collecting machine learning notebook data structures from a private data store 402.

Operation 904 can be performed, e.g., by pipeline learner 405. Operation 904 comprises labeling first cells (e.g., cells 1-8) of the first machine learning notebook data structure 111, resulting in first labeled cells 1-8, wherein first labels 122-125 applied to the first labeled cells 1-8 can be used to identify first machine learning pipeline stages 232-235 of a first machine learning pipeline 341 or 342 defined by the first machine learning notebook data 111.

Operation 906 can also be performed, e.g., by pipeline learner 405. Operation 906 comprises storing the first labeled cells 1-8 and the first machine learning pipeline data (e.g., the notebook 111, 121 and/or 231) in a knowledge store 409 adapted for use in connection with generating, pursuant to operation 908, a second machine learning pipeline, e.g., a pipeline of pipelines 408, for a second machine learning notebook data structure, e.g., notebook 407.

In some embodiments, generating the second machine learning pipeline 408 at operation 908 can comprise selecting the first machine learning pipeline (associated with notebook 111) for use in connection with generating the second machine learning pipeline 408. The first machine learning pipeline (associated with notebook 111) can be selected from among multiple machine learning pipelines identified in the knowledge store 409.

In some embodiments, generating the second machine learning pipeline 408 at operation 908 can comprise operations 910-914. Operation 910 comprises labeling second cells of the second machine learning notebook data structure 407, resulting in second labeled cells. Operation 912 comprises assigning different ones of the second labeled cells to different ones of the first machine learning pipeline stages

232-235 of the first machine learning pipeline based on second labels applied to the second labeled cells, resulting in a second machine learning pipeline. Operation 914 comprises testing the second machine learning pipeline 408, resulting in a success of the second machine learning pipeline or a failure of the second machine learning pipeline 408. The labeled cells of a notebook, e.g., notebook 407 can be assigned to pipeline stages, based stage assignments from other pipelines associated with other notebooks, such as notebook 111.

FIG. 10 is a flow diagram of a third example, non-limiting computer implemented method employed in connection with automated generation of machine learning pipelines, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 10 can be performed by equipment implementing an architecture 400 such as illustrated in FIG. 4. Operation 1002 comprises assigning labeled cells 1-8 of a machine learning notebook data structure 111 to multiple different groups of machine learning pipeline stages, wherein the multiple different groups are respectively associated with respective machine learning pipelines 341, 342.

Operation 1004 comprises parallel testing use of the respective machine learning pipelines 341, 342 in connection with the machine learning notebook data structure 111, wherein the parallel testing results in respective success or respective failure of the respective machine learning pipelines 341, 342.

The parallel testing can further result in respective performance measurement data, e.g., test data 415, representative of respective performance measurements associated with the respective machine learning pipelines 341, 342. The respective performance measurements can comprise respective time measurements indicative of respective execution times for the respective machine learning pipelines 341, 342 to execute.

Operation 1006 comprises comparing a first performance measurement of a first machine learning pipeline 341 with a second performance measurement of a second machine learning pipeline 342. In a scenario wherein pipeline 341 did not fail, the comparison can be used to select a best pipeline.

Operation 1008 comprises storing the respective success or the respective failure of the respective machine learning pipelines 341, 342 in a knowledge base 409 adapted for use in connection with future assignments of future labeled cells to future machine learning pipeline stages.

Figure 11:
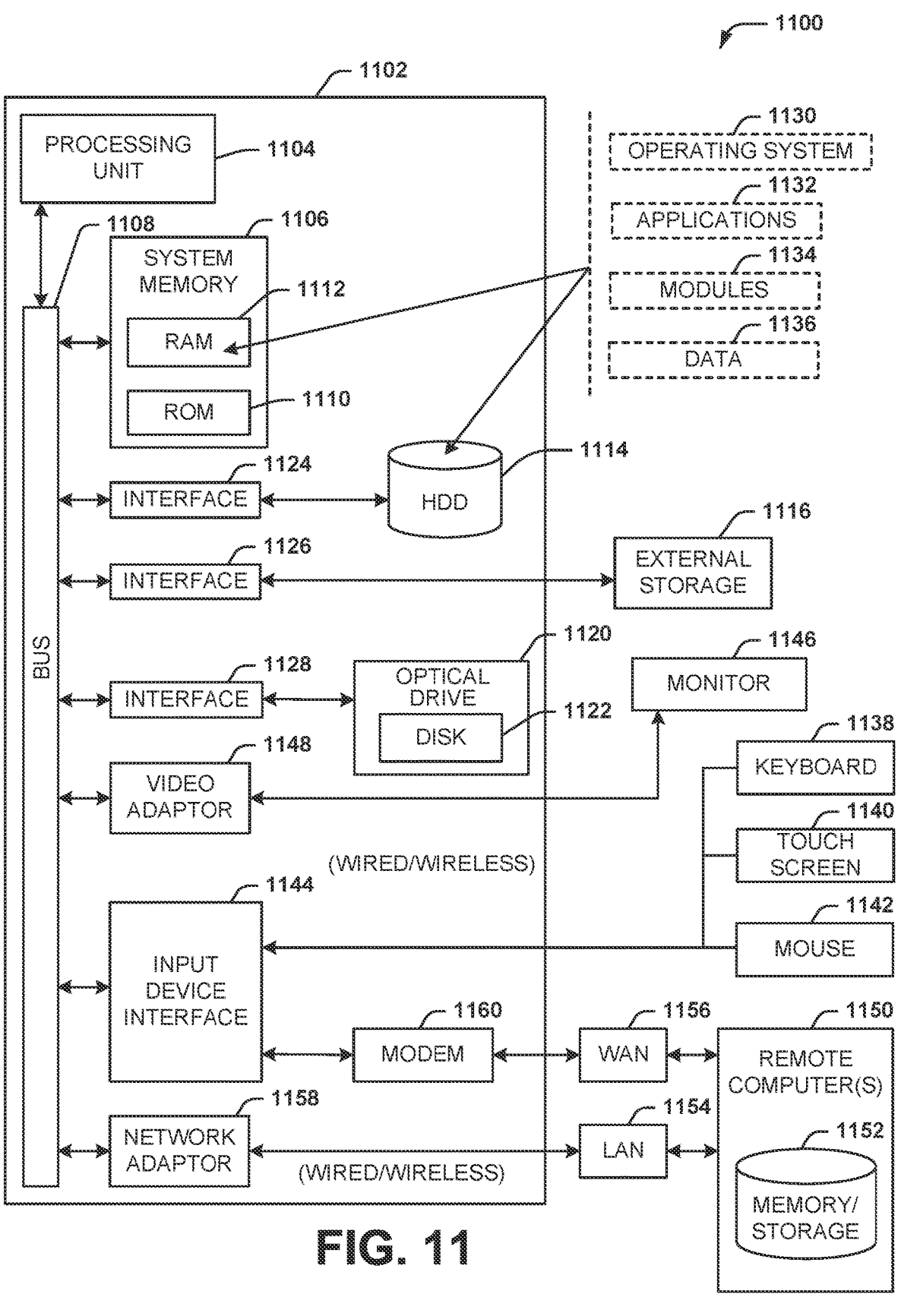
FIG. 11 illustrates a block diagram of an example computer operable to provide any of the various devices described herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual micro-processors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

iteratively retraining, by equipment comprising at least one processor, a pipeline machine learning model to generate machine learning pipelines from machine learning notebooks, wherein the retraining comprises iteratively, for each machine learning notebook data structure of a group of machine learning notebook data structures:

labeling cells of the machine learning notebook data structure, resulting in labeled cells, wherein the labeling comprises, for each cell of the cells:

parsing respective lines of code within the cell, identifying methods in the respective lines of code, and classifying the methods respectively as a library-specific method or a user created method, and labeling the cell with a label based on library-specific methods within the cell, and not based on any user created methods within the cell;

generating a machine learning pipeline using the labeled cells, wherein the generating comprises assigning the labeled cells to machine learning pipeline stages of the machine learning pipeline based on the labels applied to the labeled cells;

testing the machine learning pipeline, resulting in a success of the machine learning pipeline or a failure of the machine learning pipeline; and retraining the pipeline machine learning model to generate the machine learning pipelines from the machine learning notebooks based on the success of the machine learning pipeline or the failure of the machine learning pipeline.

2. The method of claim 1, wherein testing the machine learning pipeline results in the failure of the machine learning pipeline, and further comprising, in response to the failure of the machine learning pipeline:

re-assigning, by the equipment, a labeled cell of the labeled cells to a different machine learning pipeline stage of the machine learning pipeline stages, resulting in a reconfigured machine learning pipeline; and testing, by the equipment, the reconfigured machine learning pipeline, resulting in a success of the reconfigured machine learning pipeline or a failure of the reconfigured machine learning pipeline.

3. The method of claim 2, wherein the re-assigning of the labeled cell is based on an error log generated by the equipment in connection with testing the machine learning pipeline.

4. The method of claim 1, wherein testing the machine learning pipeline results in the success of the machine learning pipeline, and further results in performance data representative of a performance measurement associated with the machine learning pipeline.

5. The method of claim 4, wherein the performance measurement comprises a time measurement indicative of an execution time for the machine learning pipeline to execute.

6. The method of claim 4, wherein the machine learning pipeline is a first machine learning pipeline and the performance data representative of the performance measurement is first performance data representative of a first performance measurement, and further comprising:

comparing, by the equipment, the first performance measurement with a second performance measurement associated with a second machine learning pipeline; and selecting, by the equipment, based on a result of the comparing, the first machine learning pipeline or the second machine learning pipeline for deployment in connection with the machine learning notebook data structure.

7. The method of claim 1, further comprising storing, by the equipment, the success of the machine learning pipeline or the failure of the machine learning pipeline in a knowledge data store, wherein the knowledge data store is usable in connection with future assignments of future labeled cells to future machine learning pipeline stages.

8. The method of claim 1, further comprising:

collecting, by the equipment, different machine learning notebook data structures and different machine learning pipeline data indicating different machine learning pipeline stages associated with the different machine learning notebook data structures; and aggregating, by the equipment, the different machine learning notebook data structures and the different machine learning pipeline data to generate a knowledge data store that is usable in connection with assigning the labeled cells to the machine learning pipeline stages.

9. The method of claim 8, further comprising:

filtering, by the equipment, at least some of the different machine learning notebook data structures, resulting in filtered machine learning notebook data structures, wherein the filtered machine learning notebook data structures are used to generate the knowledge data store.

10. The method of claim 1, wherein:

assigning the labeled cells to the machine learning pipeline stages comprises assigning the labeled cells to multiple different groups of the machine learning pipeline stages, a different group of the multiple different groups is associated with a different machine learning pipeline of different machine learning pipelines, and testing the machine learning pipeline comprises parallel testing of the different machine learning pipelines.

11. Network equipment, comprising:

at least one processor; and at least one memory that stores executable instructions that, when executed by the at least one processor, facilitate performance of operations, comprising:

iteratively retraining a pipeline machine learning model to generate machine learning pipelines from machine learning notebooks, wherein the retraining comprises, for each machine learning notebook data structure of a group of machine learning notebook data structures, iteratively:

labeling cells of the machine learning notebook data structure, resulting in labeled cells, wherein the labeling comprises, for each cell of the cells:

parsing respective lines of code within the cell, identifying methods in the respective lines of code, classifying the methods respectively as a library-specific method or a user created method, and labeling the cell with a label based on library-specific methods within the cell, and not based on any user created methods within the cell;

generating a machine learning pipeline using the labeled cells, wherein the generating comprises assigning the labeled cells to machine learning pipeline stages of the machine learning pipeline based on the labels applied to the labeled cells;

testing the machine learning pipeline, resulting in a success of the machine learning pipeline or a failure of the machine learning pipeline; and retraining the pipeline machine learning model to generate the machine learning pipelines from the machine learning notebooks based on the success of the machine learning pipeline or the failure of the machine learning pipeline.

12. The network equipment of claim 11, wherein testing the machine learning pipeline results in the failure of the machine learning pipeline, and wherein the operations further comprise, in response to the failure of the machine learning pipeline:

re-assigning a labeled cell of the labeled cells to a different machine learning pipeline stage of the machine learning pipeline stages, resulting in a reconfigured machine learning pipeline; and testing the reconfigured machine learning pipeline, resulting in a success of the reconfigured machine learning pipeline or a failure of the reconfigured machine learning pipeline.

13. The network equipment of claim 12, wherein the re-assigning of the labeled cell is based on an error log generated in connection with testing the machine learning pipeline.

14. The network equipment of claim 11, wherein testing the machine learning pipeline results in the success of the machine learning pipeline, and further results in performance data representative of a performance measurement associated with the machine learning pipeline.

15. The network equipment of claim 14, wherein the performance measurement comprises a time measurement indicative of an execution time for the machine learning pipeline to execute, wherein the machine learning pipeline is a first machine learning pipeline and the performance data representative of the performance measurement is first performance data representative of a first performance measurement, and wherein the operations further comprise:

comparing the first performance measurement with a second performance measurement associated with a second machine learning pipeline; and based on a result of the comparing, selecting the first machine learning pipeline or the second machine learning pipeline for deployment in connection with the machine learning notebook data structure.

16. A non-transitory machine-readable medium, comprising executable instructions that, when executed by a processor, facilitate performance of operations, comprising:

iteratively retraining a pipeline machine learning model to generate machine learning pipelines from machine learning notebooks, wherein the retraining comprises iteratively for each machine learning notebook data structure of a group of machine learning notebook data structures:

labeling cells of the machine learning notebook data structure, resulting in labeled cells, wherein the labeling comprises, for each cell of the cells:

parsing respective lines of code within the cell, identifying methods in the respective lines of code, classifying the methods respectively as a library-specific method or a user created method, and labeling the cell with a label based on library-specific methods within the cell, and not based on any user created methods within the cell;

generating a machine learning pipeline using the labeled cells, wherein the generating comprises assigning the labeled cells to machine learning pipeline stages of the machine learning pipeline based on the labels applied to the labeled cells;

testing the machine learning pipeline, resulting in a success of the machine learning pipeline or a failure of the machine learning pipeline; and retraining the pipeline machine learning model to generate the machine learning pipelines from the machine learning notebooks based on the success of the machine learning pipeline or the failure of the machine learning pipeline.

17. The non-transitory machine-readable medium of claim 16, wherein testing the machine learning pipeline results in the failure of the machine learning pipeline, and wherein the operations further comprise, in response to the failure of the machine learning pipeline:

re-assigning a labeled cell of the labeled cells to a different machine learning pipeline stage of the machine learning pipeline stages, resulting in a reconfigured machine learning pipeline; and testing the reconfigured machine learning pipeline, resulting in a success of the reconfigured machine learning pipeline or a failure of the reconfigured machine learning pipeline.

18. The non-transitory machine-readable medium of claim 17, wherein the re-assigning of the labeled cell is based on an error log generated in connection with testing the machine learning pipeline.

19. The non-transitory machine-readable medium of claim 16, wherein testing the machine learning pipeline results in the success of the machine learning pipeline, and further results in performance data representative of a performance measurement associated with the machine learning pipeline.

20. The non-transitory machine-readable medium of claim 19, wherein the performance measurement comprises a time measurement indicative of an execution time for the machine learning pipeline to execute, wherein the machine learning pipeline is a first machine learning pipeline and the performance data representative of the performance measurement is first performance data representative of a first performance measurement, and wherein the operations further comprise:

comparing the first performance measurement with a second performance measurement associated with a second machine learning pipeline; and selecting based on a result of the comparing, the first machine learning pipeline or the second machine learning pipeline for deployment in connection with the machine learning notebook data structure.

* * * * *